United States Patent
Takagi et al.

(10) Patent No.: US 7,027,106 B2
(45) Date of Patent: Apr. 11, 2006

(54) DIGITAL/ANALOG BROADCAST RECEIVER RECEIVING DIGITAL/ANALOG BROADCAST IN RANGE OF READ CARRIER FREQUENCY

(75) Inventors: Toshihiro Takagi, Osaka (JP); Takahiro Katayama, Osaka (JP); Kazuhiko Tani, Osaka (JP); Kazuhide Ishihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 525 days.

(21) Appl. No.: 10/165,217

(22) Filed: Jun. 6, 2002

(65) Prior Publication Data

US 2002/0196375 A1    Dec. 26, 2002

(30) Foreign Application Priority Data

Jun. 6, 2001    (JP)    ............... P. 2001-170523

(51) Int. Cl.
*H04N 5/50*    (2006.01)
(52) U.S. Cl. .................... 348/731; 348/732; 725/38
(58) Field of Classification Search ............ 348/725, 348/726, 731, 732; 725/38, 56; 455/142, 455/154.1, 158.1, 161.1, 161.3, 164.1, 179.1, 455/182.1
See application file for complete search history.

(56) References Cited

U.S. PATENT DOCUMENTS

| | | | |
|---|---|---|---|
| 4,527,194 A * | 7/1985 | Sirazi ..................... 725/151 |
| 6,115,080 A * | 9/2000 | Reitmeier ................ 348/731 |
| 6,249,320 B1 * | 6/2001 | Schneidewend et al. ... 348/569 |
| 6,313,886 B1 * | 11/2001 | Sugiyama ............... 348/731 |
| 6,661,472 B1 * | 12/2003 | Shintani et al. ........... 348/732 |
| 6,763,522 B1 * | 7/2004 | Kondo et al. ............ 725/39 |
| 6,775,843 B1 * | 8/2004 | McDermott .............. 725/151 |

* cited by examiner

*Primary Examiner*—Victor R. Kostak
(74) *Attorney, Agent, or Firm*—Osha Liang LLP

(57) ABSTRACT

In a digital/analog broadcast receiver, when an operating unit 11 is manipulated for tuning, an MPU reads, from a received digital broadcast, a carrier frequency that corresponds to a desired virtual channel number; reads, from a ROM, a physical channel number corresponding to the carrier frequency; reads, from the ROM, a carrier frequency range corresponding to the physical channel number; and receives a digital/analog broadcast in the carrier frequency range.

2 Claims, 4 Drawing Sheets

FIG. 6

| MAJOR NUM. | MINOR NUM. | SHORT NAME | CARRIER FREQUENCY (MHz) | CHANNEL TSID | PROGRAM NUM. | FLAGS | SERVICE TYPE | SOURCE ID | DESCRIPTORS |
|---|---|---|---|---|---|---|---|---|---|
| 12 | 0 | NBZ | 205.25 | 0x0AA0 | 0x0AA0 | — | ANALOG | 20 | ch_name |
| 12 | 1 | NBZD | 620.31 | 0x0AA1 | 0x00F1 | — | DIGITAL | 21 | ch_name serv-locat. |
| 12 | 5 | NBZ-E | 620.31 | 0x0AA1 | 0x00F2 | — | DIGITAL | 2 | ch_name serv-locat. |
| 12 | 12 | NBZ-M | 620.31 | 0x0AA1 | 0x00F3 | — | DIGITAL | 23 | ch_name serv-locat. |
| 12 | 31 | NBZ-H | 620.31 | 0x0AA1 | 0x00F8 | — | DIGITAL | 24 | ch_name serv-locat. |

70

DIGITAL/ANALOG BROADCAST RECEIVER RECEIVING DIGITAL/ANALOG BROADCAST IN RANGE OF READ CARRIER FREQUENCY

BACKGROUND OF THE INVENTION

1. Field of the Invention

The present invention relates to a digital/analog broadcast receiver that can selectively receive a digital broadcast and an analog broadcast.

2. Description of the Related Art

A period (simultaneous broadcasting period) during which a broadcasting station releases both an analog broadcast and a digital broadcast is necessary for a transition period wherein analog broadcasting is shifted to digital broadcasting. During the simultaneous broadcasting period, the broadcast can be viewed using either an analog broadcast receiver or a digital broadcast receiver. Further, both broadcasts can be viewed by a digital/analog broadcast receiver that can selectively receive a digital broadcast and an analog broadcast.

For the analog broadcasting, one channel (a physical channel) is provided for one frequency band allocated for each broadcasting station. For the digital broadcasting, however, one channel (a physical channel) and multiple channels (virtual channels) obtained by dividing the physical channels are provided for one frequency band allocated for each broadcasting station. Therefore, for digital broadcasting, more programs can be broadcast over a limited frequency band.

For example, for CATV (Cable Television) in Japan, 113 physical channels, each having a frequency bandwidth of 6 MHz, are provided for the frequency band 93 to 767 MHz. In addition, since a maximum of four virtual channels can be provided for one physical channel, a maximum of 452 programs can be broadcast. In order to set up a receiver for the reception of such an enormous number of channels, disclosed in JP-A-2000-115742, for example, is a digital broadcast receiver that automatically fetches and retrieves data and sets up a channel table (data representing the correlation between physical channels and virtual channels). According to the digital broadcast receiver, the manual setting of a channel table is not required during the installation process, and thus the installation can be facilitated.

However, the proposal in JP-A-2000-115742 is available only for digital broadcasting, and simultaneous broadcasting, for transmitting both a digital broadcast and an analog broadcast, is not taken into account. A virtual channel table (hereinafter referred to as a VCT) 70 is defined in ATSC (Advanced TV System Committee) A65-A, in which the digital broadcasting standards for the United States are set forth. A VCT 70 includes both information concerning digital broadcasting and information concerning analog broadcasting. However, when a digital/analog broadcast receiver is employed to designate a carrier frequency described in a VCT 70 and to tune the frequency, the digital/analog broadcast receiver can not receive a broadcast at a frequency that is shifted, even slightly, away from the tuned frequency.

SUMMARY OF THE INVENTION

The present invention has been made to solve the above problem, and therefore an object of the invention is to provide a digital/analog broadcast receiver that can receive a desired broadcast even when a carrier frequency, which is actually to be received, is shifted away from the carrier frequency standard.

To achieve the above objective, according to one aspect of the present invention, a digital/analog broadcast receiver that can selectively receive a digital broadcast and an analog broadcast and that includes data at a carrier frequency that corresponds to a virtual channel number for digital and analog broadcasting, comprises: a ROM in which the data are stored at the carrier frequency, a physical channel number corresponding to the data, and data for the carrier frequency range corresponding to the physical channel number; an operating unit to be tuned to a desired virtual channel number; and an MPU for controlling the ROM and the operating unit, wherein, when the operating unit is manipulated for tuning, the MPU reads, from a received digital broadcast, a carrier frequency corresponding to a desired virtual channel number, reads a physical channel number corresponding to the carrier frequency that has been read, reads the range of a carrier frequency corresponding to the physical channel number that has been read, and receives a digital/analog broadcast in the range of the carrier frequency that has been read.

According to another aspect of the present invention, a digital/analog broadcast receiver, which can selectively receive a digital broadcast and an analog broadcast that include data at a carrier frequency that corresponds to a virtual channel number for digital and analog broadcasting, comprises: storage means in which are stored the data for the carrier frequency, a physical channel corresponding to the data for the carrier frequency, and data in the range of a carrier frequency corresponding to the physical channel number, wherein a carrier frequency corresponding to a desired virtual channel number is read from a received digital broadcast, wherein a physical channel number corresponding to the carrier frequency that has been read is read from the storage means, wherein a range of a carrier frequency corresponding to the physical channel number that is obtained is read, and wherein a digital/analog broadcast is received in the range of the carrier frequency that has been read.

As is described above, the channel is tuned so that the carrier frequency is converted into a physical channel number, and the frequency range corresponding to the physical channel is received. Therefore, even when the carrier frequency that is actually to be received is shifted by the carrier frequency standard by being reflected from the wall of a building, for example, a desired digital/analog broadcast can be received.

BRIEF DESCRIPTION OF THE DRAWINGS

FIG. 6 is a diagram showing a conventional virtual channel table.

DETAILED DESCRIPTION OF THE PREFERRED EMBODIMENTS

A description will be given in more detail of preferred embodiments of the invention with reference to the accompanying drawings.

Figure 1:
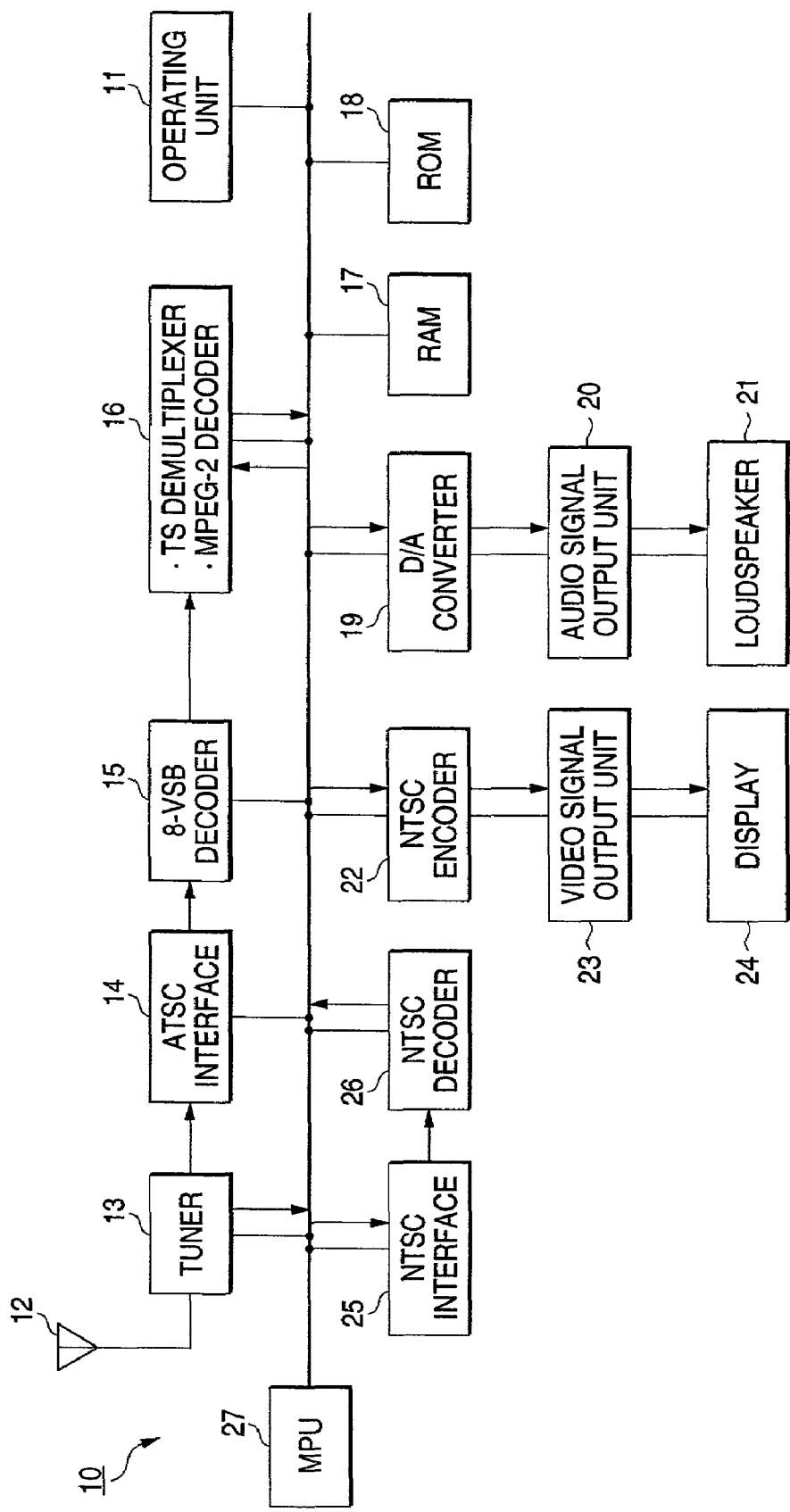
FIG. 1 is a block diagram showing the configuration of a digital/analog broadcast receiver according to the present invention.

A digital/analog broadcast receiver in accordance with the ATSC standards will now be described as an example. FIG. 1 is a block diagram showing the configuration of a digital/analog broadcast receiver 10. An operating unit 11, which may be a remote controller, is employed by a user to perform various operations, such as powering the receiver on or off or channel tuning. An antenna 12 is used to receive a digital/analog broadcasting wave that a tuner 13 uses to tune in to a digital/analog broadcast on a desired channel. An ATSC interface (hereinafter referred to as an ATSC IF) extracts a digital output wave from the tuner 13 and an 8-VSB decoder 15 demodulates the digital output wave to obtain data.

An IC 16 includes a TS demultiplexer for separating, into types, data demodulated by the 8-VSB decoder 15, and an MPEG-2 decoder for decoding the separated data to obtain data available before compression. A RAM 17 is used to store data separated by the TS demultiplexer of the IC 16, and a ROM 18 is used to store information required for the operation of the digital/analog broadcast receiver 10. A D/A converter 19 converts into analog data audio data output by the IC 16, and an audio signal output unit 20 outputs the analog audio data obtained by the D/A converter 19. A loudspeaker 21 is used to release sounds.

An NTSC encoder 22 decodes video data, previously decoded by the MPEG-2 decoder, to obtain an NTSC decoding television signal, and a video signal output unit 23 outputs the NTSC decoding television signal. A display 24 is used to display the video.

An NTSC interface (hereinafter referred to as an NTSC IF) extracts an analog output wave from the tuner 13, and an NTSC decoder 26 converts the analog output wave into a digital signal. While an MPU 27 controls the operation of the digital/analog broadcast receiver 10.

The processing performed by the digital/analog broadcast receiver 10 when receiving a digital broadcast will now be described. First, a transmitted digital broadcast is received at the antenna 12. When for tuning the operating unit 11 is manipulated, the tuner 13 switches a transponder for reception. The received digital broadcast wave is then transmitted through the ATSC IF 14, and the data is demodulated by the 8-VSB decoder 15.

Originally, a digital signal is transmitted as a TS (Transport Stream) packet by a transmission side. The TS packet is formed of control data, including video data, audio data and the VCT 70 in FIG. 6, and the control data is separated by the TS demultiplexer of the IC 16 and is stored in the RAM 17. Then, the data read from the RAM 17 is decoded by the MPEG-2 decoder to obtain data available before compression. Then, the audio data is converted into analog data by the D/A converter 19, and after passing through the audio signal output unit 20, are output as sounds by the loudspeaker 21. Further, the video data is decoded by the NTSC encoder 22 to obtain an NTSC decoded television signal, and an image is displayed on the display 24 by the video signal output unit 23.

The processing performed by the digital/analog broadcast receiver 10 for receiving an analog broadcast will now be described. First, a transmitted analog broadcast wave is received at the antenna 12. Then, when for tuning the operating unit 11 is manipulated, the tuner 13 switches a transponder for reception, and the received analog broadcast wave is transmitted through the NTSC IF 25 and is converted into a digital signal by the NTSC decoder 16. Thereafter, the digital signal is transmitted to the IC 16, and is processed in the same manner as for the digital broadcast. In this case, since the NTSC decoder 26 is provided between the IF 25 and the IC 16, the IC 16 can be employed in common for both digital and analog broadcasting.

For tuning, the user employs the operating unit 11 to designate a virtual channel, which includes a main channel and a sub-channel. In the VCT 70 in FIG. 6, major num. corresponds to the main channel and minor num. corresponds to the sub-channel. In FIG. 6, the virtual channel for which the minor num. is "0" represents an analog broadcast. Hereinafter, assume that the interval between the number of the main channel and the number of the sub-channel is delimited by using a "-", and that "12-23", for example, represents main channel 12 and sub-channel 34.

Figure 2:
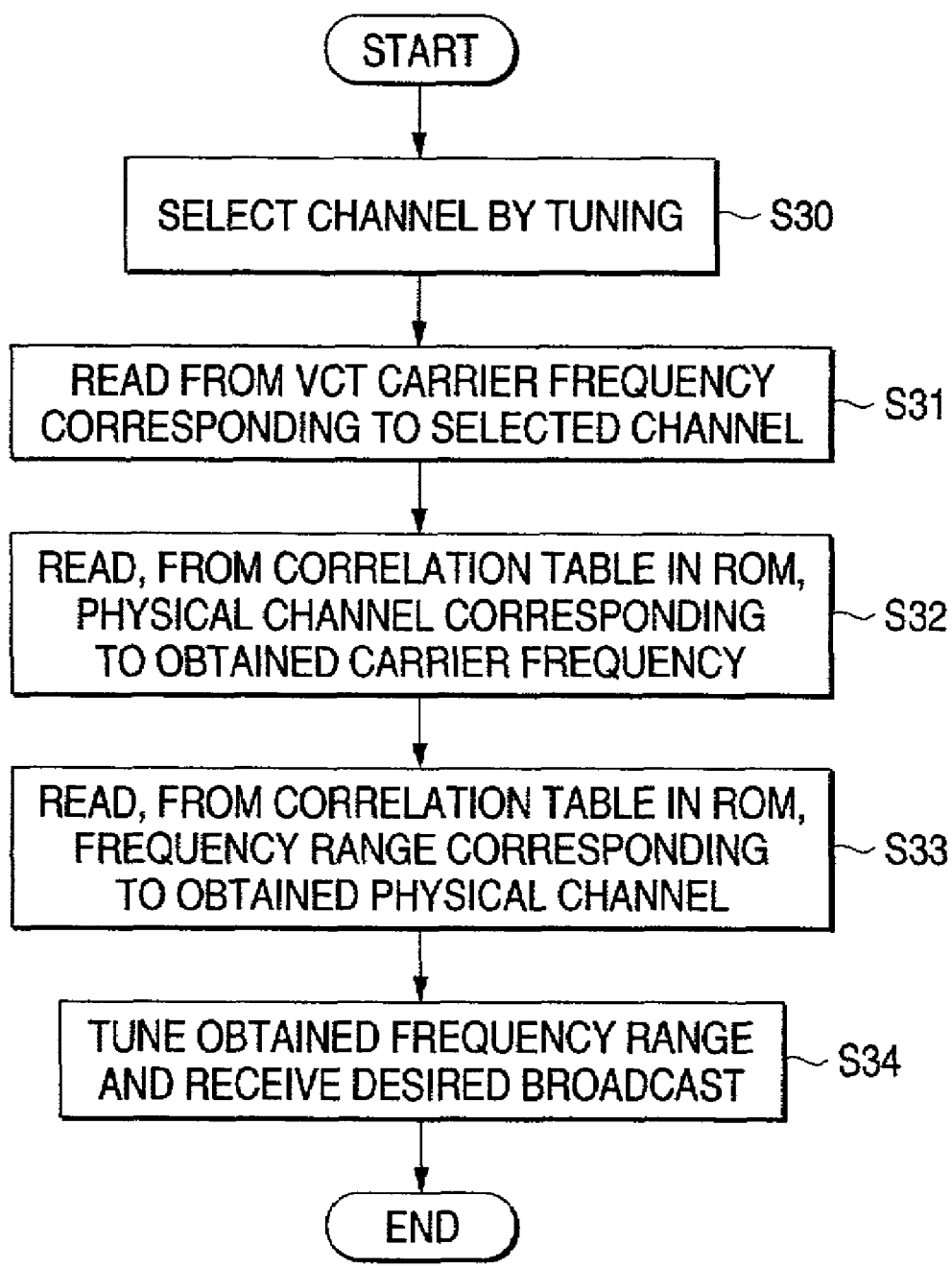
FIG. 2 is a flowchart showing the processing performed by the digital/analog broadcast receiver according to the present invention.

An explanation will be given for the processing performed by the digital/analog broadcast receiver 10 to perform channel tuning for a desired broadcast. FIG. 2 is a flowchart for the processing performed by the digital/analog broadcast receiver 10. When, at step S30, a channel is selected by manipulating the operating unit 11 for the digital/analog broadcast receiver 10, at step S31 "carrier freq." (carrier frequency) is read from the VCT 70 for the designated major num. and minor num.

Figure 3:
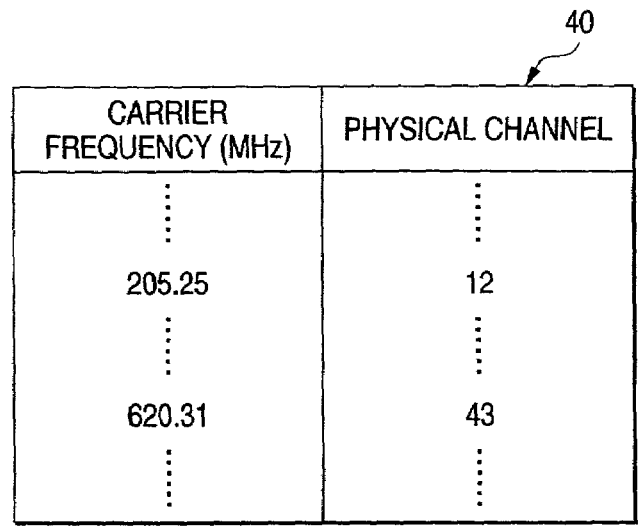
FIG. 3 is a diagram showing physical channel numbers corresponding to carrier frequencies for the digital/analog broadcast receiver according to the invention.
Figure 4:
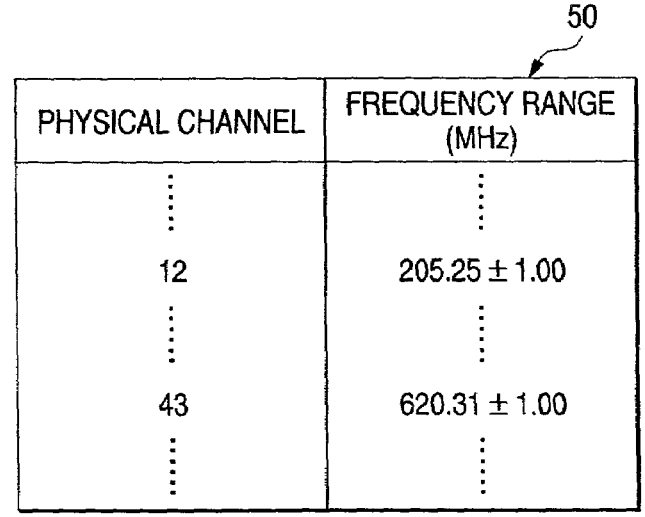
FIG. 4 is a diagram showing carrier frequency ranges corresponding to the physical channel numbers for the digital/analog broadcast receiver according to the invention.

Program control then advances from step S31 to step S32, and a physical channel number corresponding to the carrier frequency is read from a correlation table 40 in FIG. 3, which is stored in the ROM 18. Then, at step S33, in accordance with the physical channel number, a corresponding frequency range that is to be received is read from a correlation table 50 in FIG. 4, which is stored in the ROM 18. Following this, at step S34 the tuner 13 is adjusted to receive the frequency range that has been read, and a desired broadcast is received.

When, for example, channel 12-1 for digital broadcasting is selected by tuning while the digital broadcast for another specific channel is being received, the digital/analog broadcast receiver 10 reads, from the received VCT 70, carrier freq. "620.31 MHz", which corresponds to major num. "12" and minor num. "1". Then, the digital/analog broadcast receiver 10 reads, from the correlation table 40 in the ROM 18, physical channel number "43", which corresponds to 620.31 MHz, and in addition, reads from the correlation table 50, frequency range "620.31±1.00 MHz", which corresponds to physical channel "43". The tuner 13 is tuned in order to receive the frequency in the 620.31±1.00 MHz range, and the digital broadcast for channel 12-1 is received.

Further, when, for example, channel 12 for an analog broadcast is selected by tuning, the digital/analog broadcast receiver 10 reads, from the received VCT 70, carrier freq. "205.25 MHz", which corresponds to major num. "12" and minor num. "0". Then, in the same manner as when channel 12-1 is tuned, the analog broadcast for channel 12 is received.

As is described above, instead of tuning the carrier frequency in the VCT 70, the carrier frequency is converted into a physical channel number, and the frequency range corresponding to the physical channel number is tuned and received. Therefore, even when the carrier frequency that is actually to be received is shifted away from the carrier frequency standard because it is reflected by a building wall, for example, a desired broadcast can be received.

Figure 5:
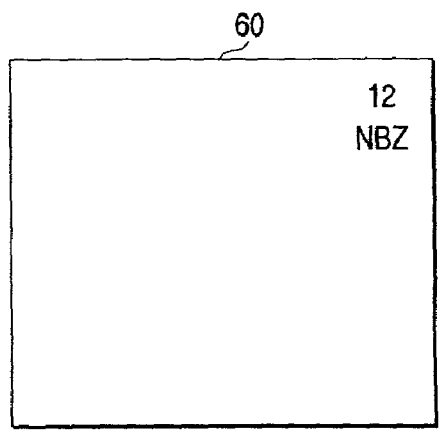
FIG. 5 is a diagram showing an image on which, for example, a broadcasting station name is displayed in accordance with the digital/analog broadcast receiver of the invention.

In the VCT 70, a short name (broadcasting station name) may be processed to obtain an image 60 shown in FIG. 5, and this image 60 may be presented on the display 24 by being superimposed on video. When the data in the VCT 70, concerning the analog broadcast that has already been received for the digital broadcast, is employed, the above presentation is also available during the reception of an analog broadcast.

The digital/analog broadcast receiver 10 of the invention is applied not only for the ATSC standards explained in the embodiment, but also for other standards, so long as data, such as those in the VCT 70, concerning the virtual channel number and the carrier frequency are included.

In this embodiment, the digital/analog television system wherein the digital/analog broadcast receiver 10 is integrally formed with the loudspeaker 21 and the display 24 has been explained. However, a digital/analog broadcast receiver, such as a digital/analog broadcast tuner or a video system, that does not include the loudspeaker 12 and the display 24, may also be employed.

According to the invention, the digital/analog broadcast receiver comprises storage means wherein data are stored for carrier frequencies, physical channel numbers corresponding to the carrier frequency data, and carrier frequency ranges corresponding to the physical channel numbers. The digital/analog broadcast receiver reads, from a received digital broadcast, a carrier frequency that corresponds to a desired virtual channel number; reads, from the storage means, a physical channel number corresponding to the carrier frequency; reads the carrier frequency range that corresponds to the physical channel number; and receives a digital/analog broadcast in the carrier frequency range. Therefore, even when a carrier frequency that is actually to be received is shifted from the carrier frequency standard, a desired broadcast can be received.

What is claimed is:

1. A digital/analog broadcast receiver that can selectively receive a digital broadcast and an analog broadcast and that includes data at a carrier frequency that corresponds to a virtual channel number for digital and analog broadcasting, the receiver comprising:
   a ROM in which said data are stored at said carrier frequency, a physical channel number corresponding to said data, and data for the carrier frequency range corresponding to said physical channel number;
   an operating unit to be tuned to a desired virtual channel number; and
   an MPU for controlling said ROM and said operating unit, wherein, when said operating unit is manipulated for tuning, said MPU reads, from a received digital broadcast, a carrier frequency corresponding to a desired virtual channel number, reads a physical channel number corresponding to said carrier frequency that has been read, reads the range of a carrier frequency corresponding to said physical channel number that has been read, and receives a digital/analog broadcast over said entire range of said carrier frequency that has been read.

2. A digital/analog broadcast receiver, which can selectively receive a digital broadcast and an analog broadcast that include data at a carrier frequency that corresponds to a virtual channel number for digital and analog broadcasting, the receiver comprising:
   storage means in which are stored said data for said carrier frequency, a physical channel corresponding to said data for said carrier frequency, and data in the range of a carrier frequency corresponding to said physical channel number,
   wherein a carrier frequency corresponding to a desired virtual channel number is read from a received digital broadcast, wherein a physical channel number corresponding to said carrier frequency that has been read is read from said storage means,
   wherein a range of a carrier frequency corresponding to said physical channel number that is obtained is read, and
   wherein a digital/analog broadcast is received over the entire range of said carrier frequency that has been read.

* * * * *